United States Patent
Pruitt et al.

(10) Patent No.: US 8,601,778 B2
(45) Date of Patent: *Dec. 10, 2013

(54) FEEDING FOR WIDE CUT ROTARY HEADER HAVING HELPER ROLL

(71) Applicant: AGCO Corporation, Duluth, GA (US)

(72) Inventors: Martin E. Pruitt, Hesston, KS (US); Brendon Nafziger, Canton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,159

(22) Filed: Oct. 22, 2012

(65) Prior Publication Data

US 2013/0042592 A1 Feb. 21, 2013

Related U.S. Application Data

(63) Continuation of application No. 12/897,423, filed on Oct. 4, 2010, now Pat. No. 8,291,685.

(51) Int. Cl.
 *A01D 43/00* (2006.01)
(52) U.S. Cl.
 USPC .......................................................... 56/157
(58) Field of Classification Search
 USPC ..... 56/16.4 A–16.4 C, 16.4 R, 157, 255, 256, 56/295, 320.1, 320.2
 See application file for complete search history.

(56) References Cited

U.S. PATENT DOCUMENTS

| | | | | |
|---|---|---|---|---|
| 3,462,922 A | * | 8/1969 | Phillips et al. | 56/14.3 |
| 3,685,429 A | * | 8/1972 | McBride | 99/349 |
| 4,637,201 A | * | 1/1987 | Pruitt et al. | 56/16.4 B |
| 6,158,201 A | * | 12/2000 | Pruitt et al. | 56/6 |
| 6,601,375 B1 | * | 8/2003 | Grahl et al. | 56/16.6 |
| 7,454,888 B2 | * | 11/2008 | Barnett | 56/14.7 |
| 8,015,784 B2 | * | 9/2011 | Barnett et al. | 56/157 |
| 2001/0015138 A1 | * | 8/2001 | Huber et al. | 99/353 |
| 2005/0126147 A1 | * | 6/2005 | Nickel et al. | 56/16.4 B |
| 2009/0071116 A1 | * | 3/2009 | Barnett | 56/153 |

* cited by examiner

*Primary Examiner* — Thomas B Will
*Assistant Examiner* — Mai Nguyen

(57) ABSTRACT

In an example embodiment, a harvesting header includes a helper roll having an auger flighting configured to move crop material laterally inward. The auger flighting may be outboard of a crop receiving area. The helper roll may be placed rearward of a cutter mechanism and forward of a conditioning roll of the header. The axis of rotation of the helper roll may be positioned slightly above a cutting plane of a cutting bed so that the auger flighting extends vertically past the cutting plane. In an example embodiment, at least a portion of the auger flights are positioning outboard of a conditioning roll of the header. The helper roll may be supported within the cutting zone and comprised of a plurality of sub-helper rolls.

2 Claims, 13 Drawing Sheets

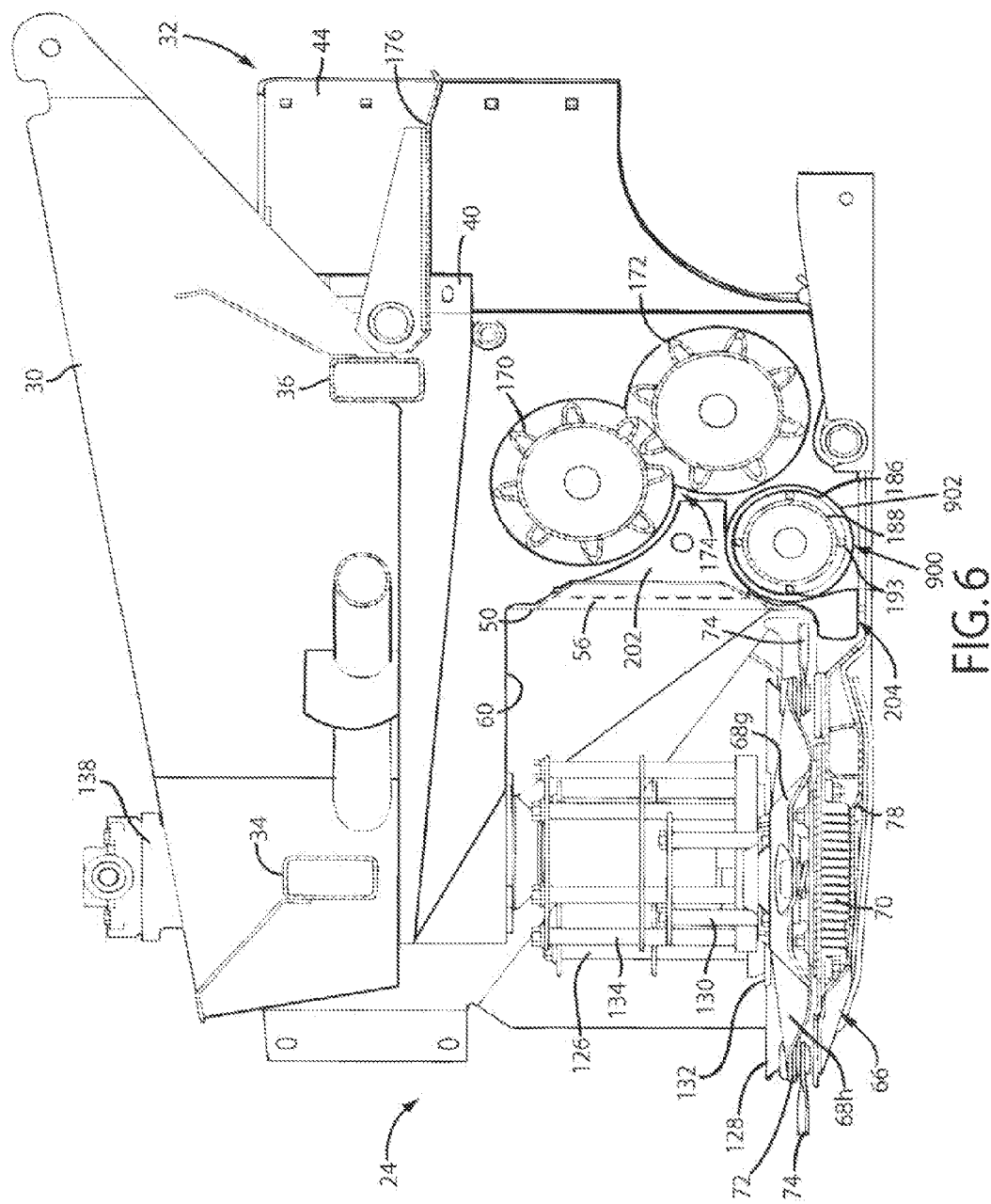

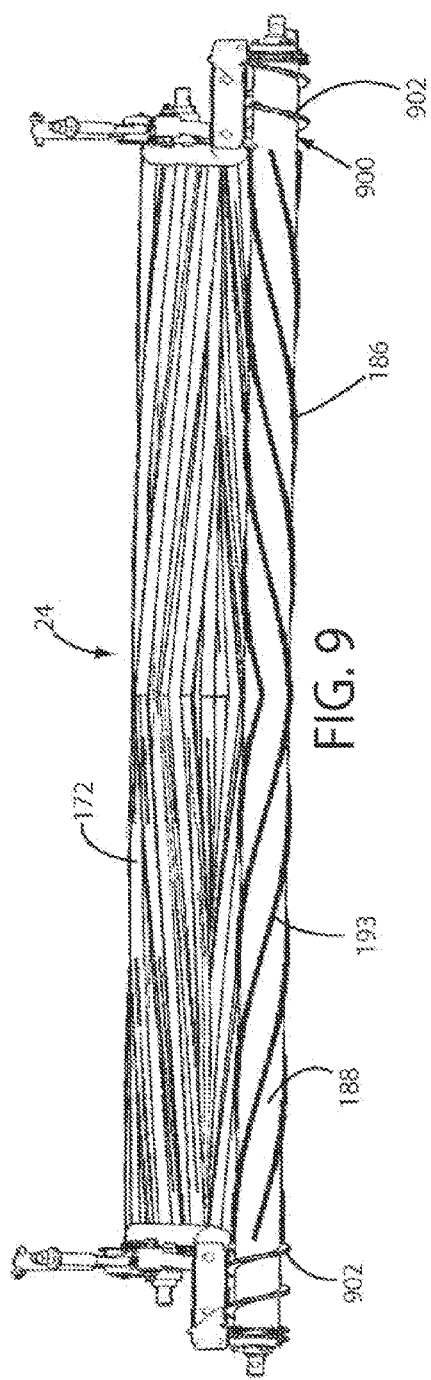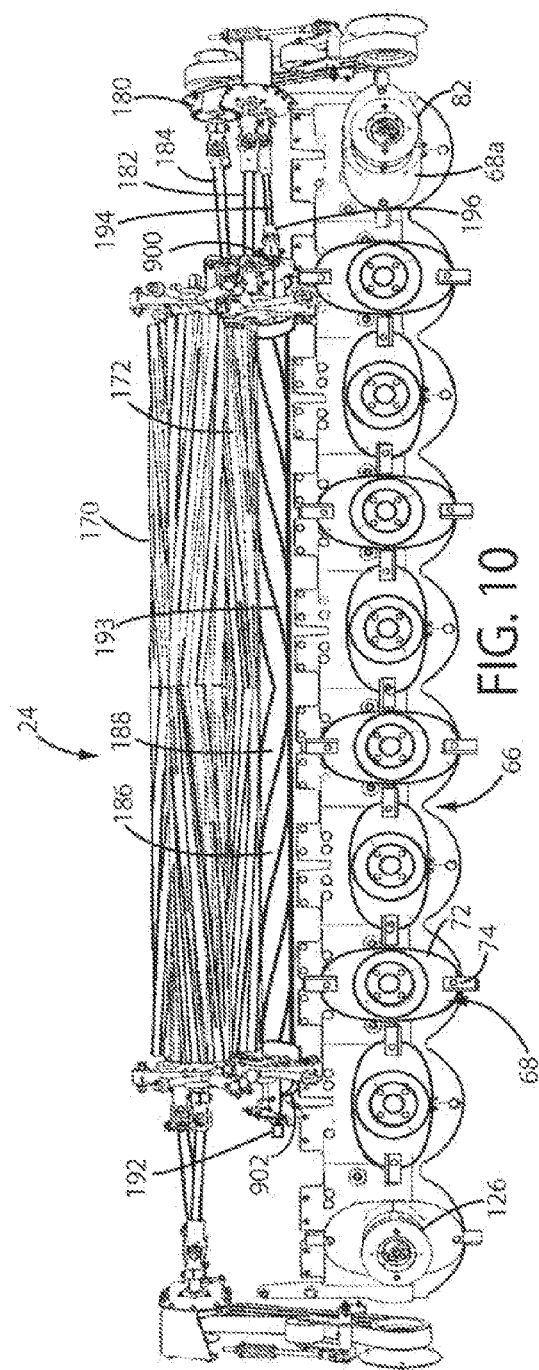

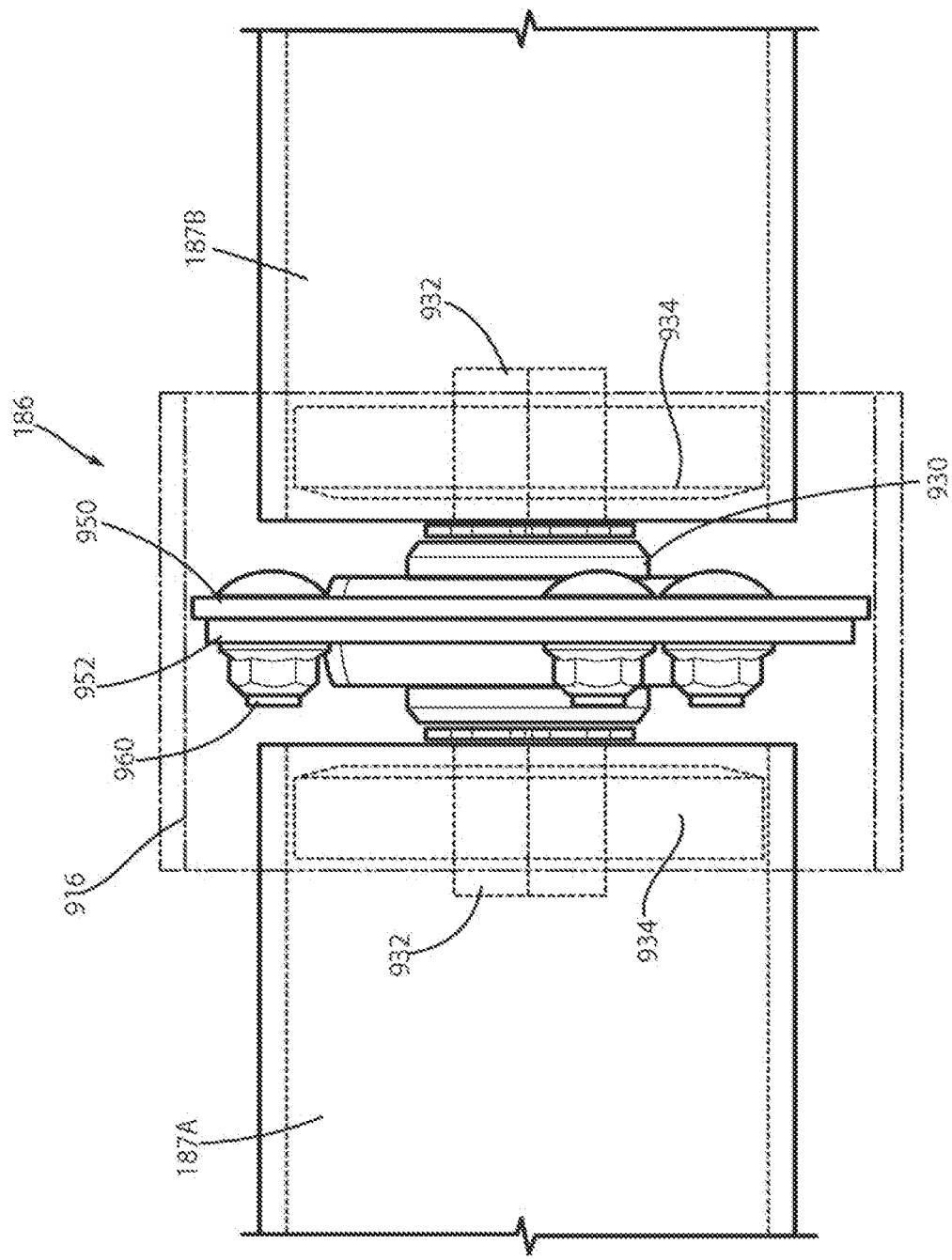

FEEDING FOR WIDE CUT ROTARY HEADER HAVING HELPER ROLL

RELATED APPLICATION

This application is a continuation of prior application Ser. No. 12/897,423, filed Oct. 4, 2010, entitled "WIDE CUT ROTARY HARVESTER HAVING HELPER ROLL WITH AUGER FLIGHTING" which is hereby incorporated in its entirety by reference herein.

TECHNICAL FIELD

The present invention relates to crop harvesting machines of the type that use rotary cutters to sever standing crops from the field and then condition the cut crop between one or more sets of conditioning rolls before depositing the crop back onto the ground in the form of a windrow or swath. More particularly, it relates to wide cut machines in which the cutting width is significantly greater than the width of a central opening leading to the conditioning rolls such that crop materials cut outboard of the opening are moved inwardly from the outboard cutters after severance before turning rearwardly through the opening and into the conditioner rolls.

BACKGROUND

Wide cut rotary harvesters present inherent challenges in getting outboard severed crop materials to flow smoothly and without hesitation in a lateral direction toward the center of the machine before then turning rearwardly and moving through a central discharge opening into the conditioner rolls. Hesitation on the part of the crop materials as they "turn the corner" and move rearwardly into the conditioner rolls can cause problems, both in the quality of the finished windrows and the quality of cutoff being achieved by the rotary cutters. Due to the increased speeds at which rotary harvesters can travel compared to that of sickle-type machines, cutoff, feeding and control problems are exacerbated in rotary machines due to the dramatically increased volume of cut material flowing through the machines.

In one rotary cutter bed design, a group of inboard cutters of the bed are arranged with their axes of rotation directly in front of the opening to the conditioner rolls, inboard of conditioning structure on the rolls. One or more additional outboard cutters may be provided at each end of the bed and have their axes of rotation located outboard of the opening and the conditioning structure. In some situations, some or all of the crop streams end up against wall structure behind the outboard cutters.

This undesirable condition seems most likely to occur if the end cutters of the inboard group are so situated that their cutting knives project outboard of conditioning structure on the conditioning rolls as the knives are moving rearwardly in their paths of travel. It also seems to be the most pronounced when only a partial cut is being taken by the harvester wherein the outboard cutters at one end of the bed are presented with no standing crop material to sever. Cut materials that find their way behind outboard cutters tend to collect in that area and ultimately work their way forward, impeding proper cutoff and otherwise interfering with proper flow into the conditioner rolls. Sometimes, the accumulating material may even shoot out the ends of the cutter bed, rather than flowing to the center and being processed by the conditioner rolls. Such problems are magnified in machines having wide cutter beds with at least one cutter located outboard of the ends of the conditioning rolls, whereby crop material has a tendency to plug behind impeller cages and create excessive carry around behind the impeller cages and out the end of the header.

BRIEF DESCRIPTION OF THE DRAWINGS

FIG. 6 is a cutaway view shows an example embodiment of a harvesting header;

FIG. 9 shows an example embodiment of a harvesting header with an augered helper roll;

FIG. 10 shows an example embodiment of an augered helper roll employed in a harvesting header having two pairs of conditioning rolls;

FIG. 16 shows an example embodiment of a helper roll that includes two sub-helper rolls.

OVERVIEW

Figure 1:
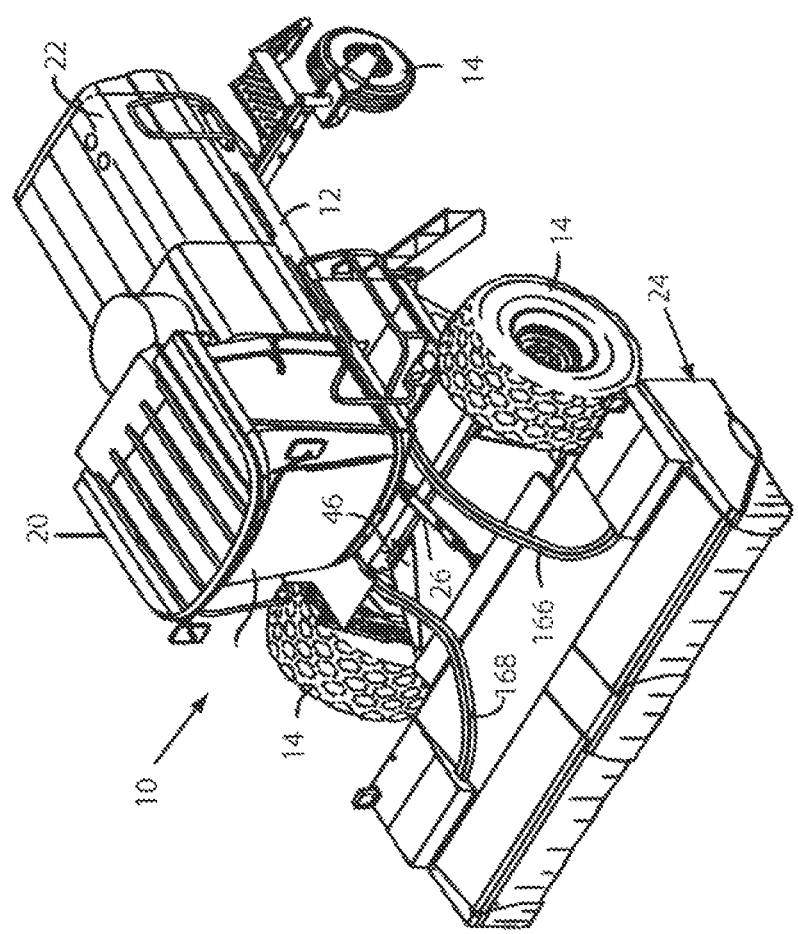
FIG. 1 shows a perspective view of an example embodiment of a self-propelled windrower that may employ a helper roll in accordance with the invention.

In an example embodiment, an apparatus is provided to convey cut crop from a crop cutting assembly to the conditioning rolls of a header, so as to improved crop flow through the header and transfer crop material cut by rotary cutters to a nip defined between crop conditioning rolls.

In one example embodiment, a harvesting machine includes a crop cutting assembly defining a cutting zone, laterally extending crop conditioning rolls defining a nip therebetween that is spaced rearwardly from the cutting zone, and a helper roll having auger flights to urge crop from the cutting zone toward the nip. The axis of rotation of the augered helper roll may be rearward of the cutting zone and forward of the conditioning roll and vertically lower than the conditioning roll. The augered helper roll may be positioned such that the axis of rotation of the helper roll may be slightly above the blade level of cutters in the cutting bed and the augered portion vertically overlaps the vertical blade level or cutting level of the cutter mechanism.

In one example embodiment, a helper roll comprises a laterally extending rotatable roll having at least one auger flight outboard of a lateral end of a conditioning roll and a discharge opening to convey crop material laterally inward with respect to the roll. The helper roll may be positioned proximate the conditioning rolls to urge crop material toward the nip.

In another example embodiment, a helper roll may further comprise a mounting assembly for rotatably supporting at least a portion of the helper roll inboard of the end of the conditioning rolls and outer end of a discharge opening. In an example embodiment a bearing assembly may be mounted within the discharge opening and a continuous shaft extending through a first and second portion and a second portion provided with peripheral engaging surfaces. In an example embodiment, a hex bore bearing assembly may be used to rotatably support the shaft of the sub-helper rolls. A shield may be provided to the mounting assembly to protect the joint and bearing assembly.

Other aspects and advantages of the invention will become apparent from the following detailed description and accompanying drawings.

DETAILED DESCRIPTION

As required, example embodiments of the present invention are disclosed. The various embodiments are meant to be non-limiting examples of various ways of implementing the invention and it will be understood that the invention may be embodiment in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art so variously employ the present invention.

Turning to the figures wherein like numbers represent like elements throughout the several views, FIG. 1 shows a harvester in the form of a self-propelled windrower 10 operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 for movement across a field to be harvested. The frame 12 carries a cab 20, within which an operator controls operation of the windrower 10, and a rearwardly spaced compartment 22 housing a power source (not shown) such as an internal combustion engine. A harvesting header 24 is supported on the front of the frame 12 in a manner understood by those skilled in the art.

The header 24 may be similar to that disclosed in U.S. Pat. No. 6,158,201 entitled "Rotary Mower Conditioner Having Improved Crop Flow," U.S. Pat. No. 7,726,108 entitled "Wide Cut Rotary Harvester Having Crop Feeder Mechanism", and U.S. Patent Publication 2007/0079592 entitled "Crop Harvester Having Metal Conditioner Rolls With Herringbone Rib Pattern" all of which are assigned to the assignee of the present invention and hereby incorporated by reference in their entirety herein. The header 24 may be configured as a modular unit and consequently may be disconnected for removal from the frame 12. Accordingly, the frame 12 is not dedicated only to those harvesting operations provided by the header 24, but may carry other modular header designed to perform different harvesting operations. Similarly, the header 24 may be removed from the frame 12 and installed on other variously constructed mobile frames, such as a pull-type implement. In this respect, it will be appreciated that the principles of the present invention are equally applicable to pull-type harvesting machines and machines dedicated only to mowing and conditioning crop.

The header may have a generally open, box-like framework 32 that includes a pair of tubular cross beams 34 and 36 (see FIG. 6) supported at opposite ends by side plates 38 and 40 to project rearwardly therefrom. The shield supports 42, 44 converge rearwardly (see FIG. 3) and support the windrow forming shields, generally denoted by the reference numeral 46 in FIG. 1. A pair of laterally extending, upright outboard plates 48 and 50 project outwardly beyond the cross beams 34 and 36, with the inner ends of the outboard plates 48 and 50 defining therebetween the front boundary of a discharge opening 52 through which cut crop passes as it moves rearwardly in the header.

A laterally extending crop cutting assembly in the form of a low profile, rotary style cutter be 66 is located adjacent the front of the header framework 32 for severing crop from the ground as the harvester 10 moves across a field. A helper roll 186 is provided with outer portions 900 that include auger flights 902 for urging crop material cut by the cutter bed 66 laterally inward. The illustrated cutter bed 66 includes a series often rotary cutters 68 spaced across the path of travel of the harvester 10 and each being rotatable about its own upright axis (see FIG. 3). A larger or smaller number of cutters could be provided. For the sake of convenience, the cutters 68 are denoted by the letters 68a-68j, beginning with the leftmost cutter in the series as viewed from the rear of the machine. The cutters 68a-j are rotatably supported on an elongated, flat gear case 70 extending the full length of the cutter bed 66. The gear case 70 may contain a train of flat spur gears (not shown) that are operably engaged with one another and thus serve to distribute driving power between one another, although other forms of power distribution means may be used within the case 70 (e.g., shafts and bevel gears, belts and pulleys, or chains and sprockets).

It will be appreciated that the cutters 68a-68j are similar in construction. For sake of brevity, only one of the cutters will be described in detail herein with the understanding that the remaining cutters are similarly constructed. Each of the cutters 68a-68j may include a generally elliptical, metal knife carrier 72, and a pair of free swinging knives 74 at opposite ends of the carrier 72, as well understood by those of ordinary skill in the art. As perhaps best shown in FIG. 3, each of the cutters 68a-68j may be ninety degrees out of phase with respect to the adjacent cutters, inasmuch as the circular paths of travel of the knives of adjacent cutters overlap one another and may be appropriately out of phase in order to avoid striking each other. Due to the positive mechanical drive connection between the cutters 68*a*-68*j* through the spur gears in the case 70, the cutters remain properly in phase with one another.

Those ordinarily skilled in the art will appreciate that the cutting action provided by the cutter bed 66 is not necessarily consistent from one plant to another, as the machine 10 moves across the field. For example, severance of the crop may occur directly in front of one of the cutters 68*a*-68*j* or within one of the front notches 80. Nonetheless, the rotating knives 74 of the cutters 68*a*-68*j* cooperatively present a substantially planar cutting zone, within which crop is severed from the ground.

In the illustrated embodiment, header 24 has a centrally disposed discharge opening 52 behind the cutter bed 66 that is shorter than cutter bed 66 and which serves as an inlet to a set of conditioner rolls 170, 172 such that those cutters may be described as a group of "inboard" cutters. On the other hand, the axes of rotation of cutters 68*a*, 68*b* and 68*i*, 68*j* are all disposed outboard of the lateral limits of opening 52 and outboard of conditioning structure on rolls 170, 172 such that those cutters may be described as "outboard" cutters. While the illustrated embodiment has two sets of outboard cutters, other embodiments may utilize only a single set of outboard cutters, or more than two sets.

Thus, it will be noted that the cutter bed 66 projects laterally outwardly beyond both ends of the discharge opening 52 to present left and right outboard cutter sections comprising cutters 68*a*, 68*b* and 68*i*, 68*j*, respectively. The spur gears in the case 70 are intermeshed in such a manner that the cutters 68*a*, 68*b* and 68*i*, 68*j* of each outboard section rotate in the same direction, as indicated by the arrows in FIG. 2. It will also be appreciated that the spur gears may be arranged in such a manner that the inner cutters 68*b*-68*i* (excluding the outermost cutters 68*a* and 68*j*) are divided into cooperating pairs, with the two cutters of each pair rotating in opposite directions. In other words, the cutters 68*b* and 68*c* rotate toward one another across the front of the cutter bed 66, as do the cutters 68*d* and 68*e*, the cutters 68*f* and 68*g*, and the cutters 68*h* and 68*i*. The illustrated cutter bed 66 is of the same general arrangement as that disclosed in the '201 patent and U.S. Pat. No. 5,463,852 entitled "Wide Cut Harvester having Rotary Cutter Bed," assigned to the assignee of the present invention, which is hereby incorporated by reference in its entirety herein.

Each pair of oppositely rotating cutters sends a stream of severed material rearwardly between them as the machine moves through the field of standing crop. The outermost outboard cutters 68*a* and 68*j* rotate in the same direction as the inwardly adjacent outboard cutters 68*b* and 68*i*, respectively. Thus, outermost outboard cutter 68*a* rotates in a clockwise direction viewing FIG. 2, while outermost outboard cutter 68*j* rotates in a counterclockwise direction viewing that same figure. Consequently, crop material cut by outboard cutters 68*a*, 68*b* and 68*i*, 68*j* is thrown laterally inwardly across the front of the machine to the overlap region between 68*b*, 68*c* and 68*h*, 68*i*, where it is swept rearwardly.

Each of the outboard cutter sections 68*a*, 68*b* and 68*i*, 68*j* is associated with an overhead crop conveying assembly for facilitating movement of crop cut by the outboard cutter section inwardly and rearwardly to the discharge opening 52. Turning initially to the left outboard cutter section (see FIGS. 4B and 5B), an impeller cage 82 is fixed to the outermost cutter 68*a* for rotational movement therewith about a common axis. The impeller cage 82 is of the same general construction as the impeller cages disclosed in U.S. Pat. No. 5,421,145 entitled "Cut Crop Impeller Cage For Rotary Type Cutter Beds," assigned to the assignee of the present invention, which is hereby incorporated by reference in its entirety herein. It will be noted that a crop lifter 84 may be fixed between the metal knife carrier of the outer cutter 68*a* and the impeller cage 82.

An impeller cage 90 may similarly mounted to the cutter 68*b* for rotational movement therewith about a common axis. However, the impeller cage 90 is relatively shorter and smaller in overall diameter than the cage 82. In particular, the impeller cage 90 is relatively shorter and smaller in overall diameter than the cage 82. In particular, the impeller cage 90 includes only one level of spacers 92 secured between an upper disk 94 and a lower impeller plate 96. The impeller plate is of the same construction as that disclosed in U.S. Pat. No. 5,345,752 entitled "Impeller Plates For Rotary Cutting Units of a Crop Harvester", assigned to the assignee of the present invention, which is hereby incorporated by reference in its entirety herein.

An intermediate impeller cage 98 may be located between the outer and inner cages 82 and 90 and is suspended from the partition wall 58. The intermediate impeller cage 98 includes a mounting plate 99 fastened to the underside of the partition wall 58 and a center tubular support 100 fixed to the mounting plate.

It is believed that the illustrated arrangement of the cages 82, 90, 98 facilitates flow of crop materials cut outboard of the left end of the discharge opening 52. In particular, crop material engaged by the outer cage 82 is moved laterally inwardly across the front of the header and then passed slightly rearwardly to the intermediate cage 98. The intermediate cage 98 likewise conveys the crop material inwardly across the front of the header and rearwardly to the inner cage 90. The inner cage 90 in turn moves the crop material inwardly across the front of the header and then rearwardly to the discharge opening 52. Thus, the cages 82, 98, 90 cooperatively impart a rearwardly and inwardly directed converging influence on the cut crop as a result of the lateral and progressively rearward spacing of the cages. As previously noted, the lifter 84 associated with the outer cutter 68*a* serves to lift crop above the adjacent, inwardly spaced cutter 68*b* and into engagement with the cages 82, 98, 90. This prevents crop cut by the outer cutter 68*a* from being further shredded/comminuted by the adjacent, inwardly spaced cutter 68*b*.

Figure 4A:
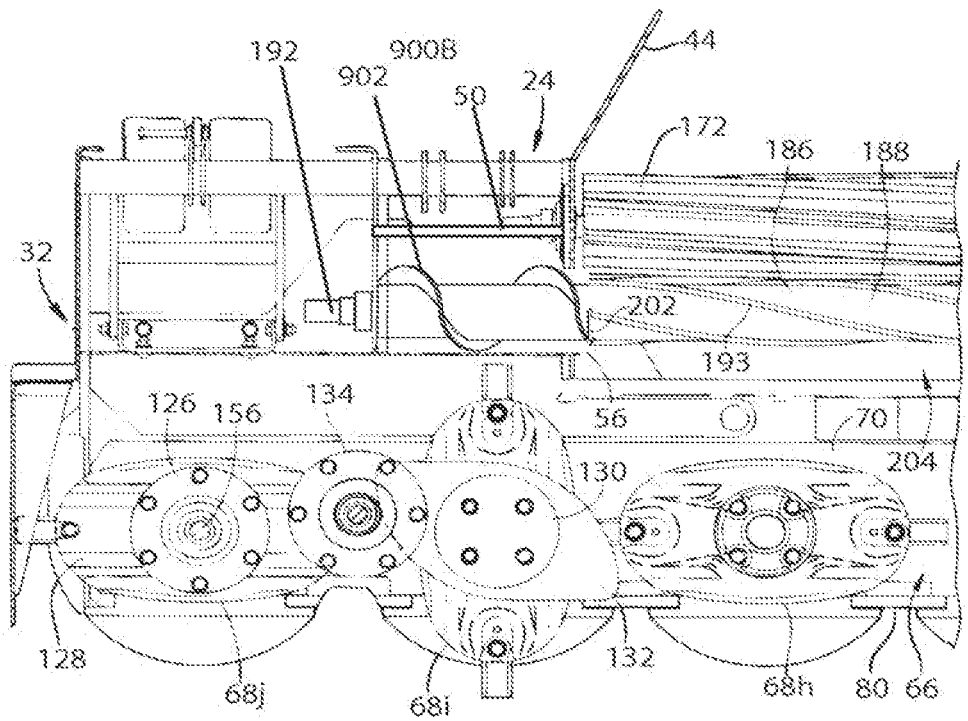
FIG. 4A shows an enlarged, fragmentary top plan view of the right side of an example embodiment of a harvesting header, particularly illustrating the three rightwardmost cutters.

The right outboard cutter section (see FIGS. 4A and 5A) is similarly associated with an overhead conveying assembly for facilitating movement of crop cut by the outboard section inwardly and rearwardly to the discharge opening 52. The overhead conveying assembly for the right outboard cutter section is similar in construction to the overhead conveying assembly previously described for the left outboard cutter section. Thus, it shall be sufficient to explain that the right overhead conveying assembly includes an impeller cage 126 fixed to the outer cutter 68*j*, with a crop lifter 128 being positioned between the impeller cage 126 and knife carrier of the cutter 68*j* for rotational movement therewith. A relatively smaller impeller cage 130 is fixed to the adjacent, inwardly spaced cutter 68*i*, along with an impeller plate 132. An intermediate impeller cage 134 is suspended from the partition wall 60 between the outer and inner cages 126, 130. The progressively rearward spacing of the front boundaries of the impeller cages 126, 134, 130 is perhaps best shown in FIG. 6.

Figure 5A:
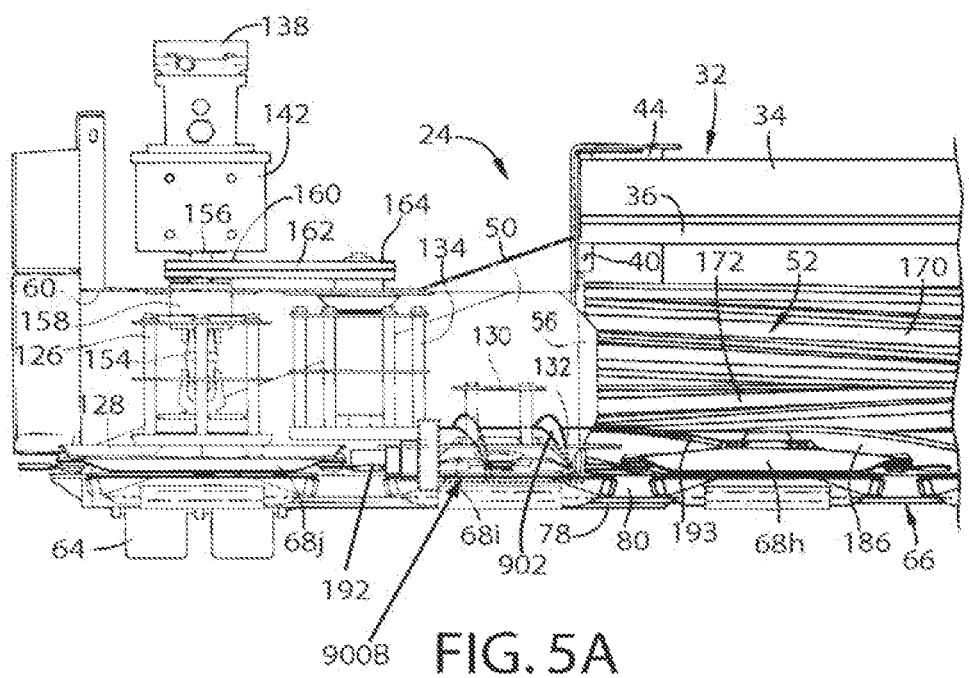
FIG. 5A shows an enlarged fragmentary front elevational view of the right side of an example embodiment of a harvesting header.

Driving power may be provided to the various driven components of the header 24 by a pair of hydraulic motors 136 and 138. As perhaps best shown in FIGS. 5A and 5B, the left motor 136 is supported on a gearbox 140 mounted to a front, laterally extending plate (not shown) of the header framework 32, while the right motor 138 is supported on a drive housing 142 similarly fastened to the front plate. The left outer cutter 68a is drivingly connected to the motor 136 by a double U-joint assembly 144 contained in the impeller cage 82 and attached to the output shaft 146 of the gearbox 140 within a sleeve 148 fixed to the partition wall 58 (See FIG. 5B). It will be noted that the output shaft 146 carries a double-belt sheave 150, with a pair of belts 152 entraining the sheaves 122, 150 to drive the intermediate impeller cage 98 in the same direction as the outer cutter 68a and associated impeller cage 82. As shown in FIG. 5A, the right outer cutter 68j is similarly connected to the motor 138 by a double U-joint assembly 154 contained within the impeller cage 126 and attached to the output shaft 156 of the drive housing 142 within a sleeve 158 fixed to the partition wall 60. The output shaft 156 likewise carries a double-belt sheave 160 entrained by a pair of belts 162. The belts 162 wrap around the driven sheave 164 fixed to the intermediate impeller cage 134 so as to drive the cage 134 in the same direction as the outer cuter 68j and the associated impeller cage 126.

With the end cutters 68a and 68j being drivingly connected to the remaining cutters 68b and 68i via the spur gears in the gear case 70, driving power is supplied to the entire cutter bed 66 by the hydraulic motors 136, 138. As shown in FIG. 1, the hydraulic motors 136, 138 are connected to the hydraulic drive and control circuit (not shown) of the mower/conditioner by respective conduits 166 and 168. In the usual manner, each conduit includes a supply line and a return line. Preferably, the hydraulic motors 136, 138 are fluidly intercommunicated so as to share the load of driving the cutters 68a-68j. In addition, the preferred hydraulic drive and control circuit is designed to drive the cutter bed 66 in such a manner that the speed of the cutters 68a-68j remains substantially constant even if the speed of the engine (not shown) driving the hydraulic pump (also not shown) for the bed 66 bogs down such as when heavy crop conditions are encountered. Such an arrangement is disclosed in U.S. Pat. No. 5,430,997, assigned to the assignee of the present invention, which is hereby incorporated by reference herein in its entirety.

Figure 2:
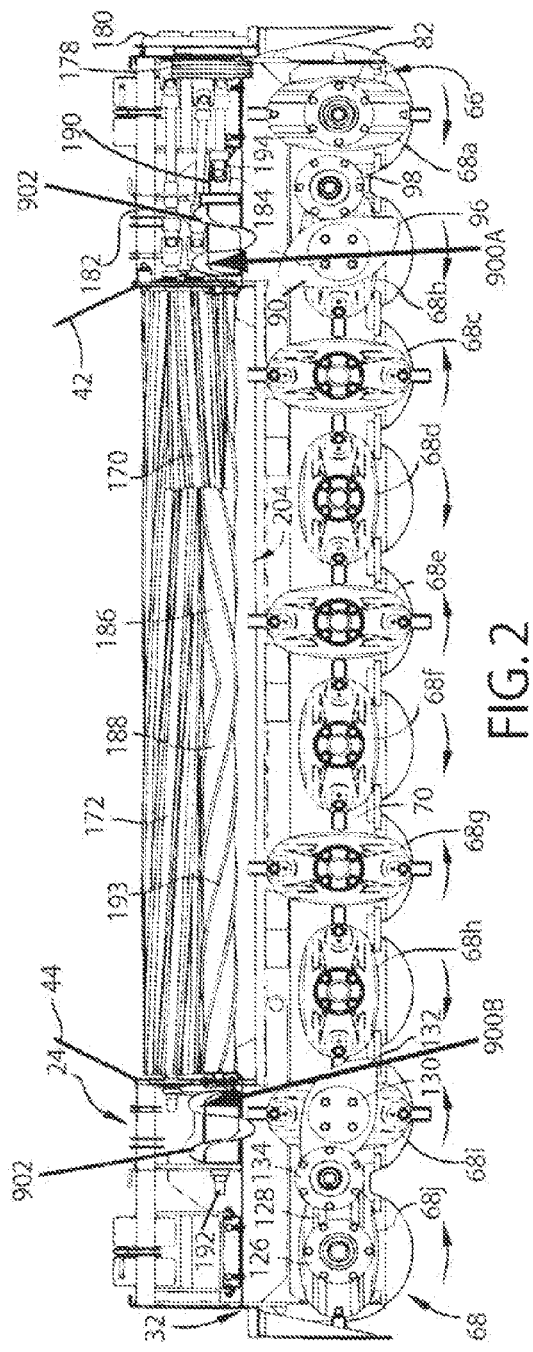
FIG. 2 shows a top view of an example embodiment of a harvesting header, with parts being broken away to illustrate the cutter bed, the crop conditioning rolls and the laterally extending crop conveying/helper roll with auger flights to convey crop from the cutter bed to the nip defined by the crop conditioning rolls.
Figure 3:
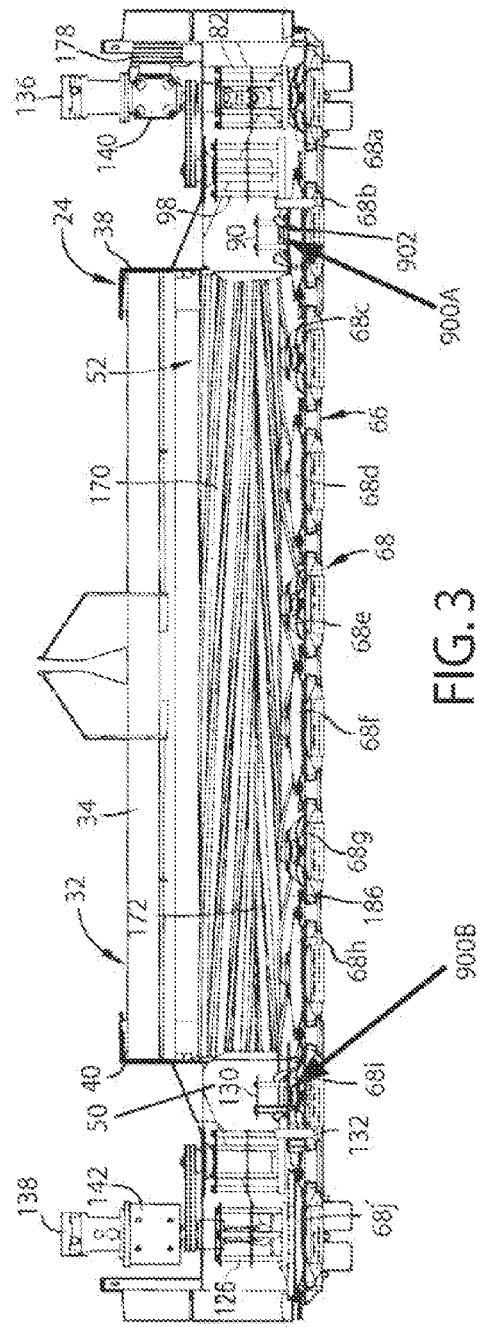
FIG. 3 shows an enlarged front elevational view of an example embodiment of a harvesting header, with parts being broken away to illustrate the cutter bed, the crop conditioning rolls, the crop helper roller with auger flights, and impeller cages for facilitating crop flow from the outboard cutters to the conditioning rolls.

As perhaps best shown in FIGS. 2 and 3, a pair of laterally extending crop conditioning rolls 170 and 172 are rotatably mounted on the supports 42 and 44 to span the discharge opening 52. In the illustrated embodiment, the conditioning rolls 170, 172 comprise cylindrical metal bodies having intermeshing helical, metal ribs extending along the length of the bodies, although other conditioning roll designs (e.g., rubber-coated rolls) may be utilized. In the example embodiment, the conditioning rolls 170, 172 are arranged in a stacked relationship for rotation about respective, vertically spaced transverse axes, with the upper roll 170 being driven in a counterclockwise direction and the lower roll 172 being driven in a clockwise direction, as indicated by the arrows in FIG. 6. In addition, the rolls 170, 172 are yieldably biased toward one another to present a biting nip 174 therebetween that receives cut crop from the cutter bed 66 and propels the same rearwardly toward the windrow forming shields 46. The nip 174 is spaced upwardly and rearwardly from -I ithe cutter bed 66. It may also be said that the nip 174 is spaced upwardly and rearwardly from the generally planar cutting zone defined by the knives 74 of the rotary 68a-68j.

Figure 4B:
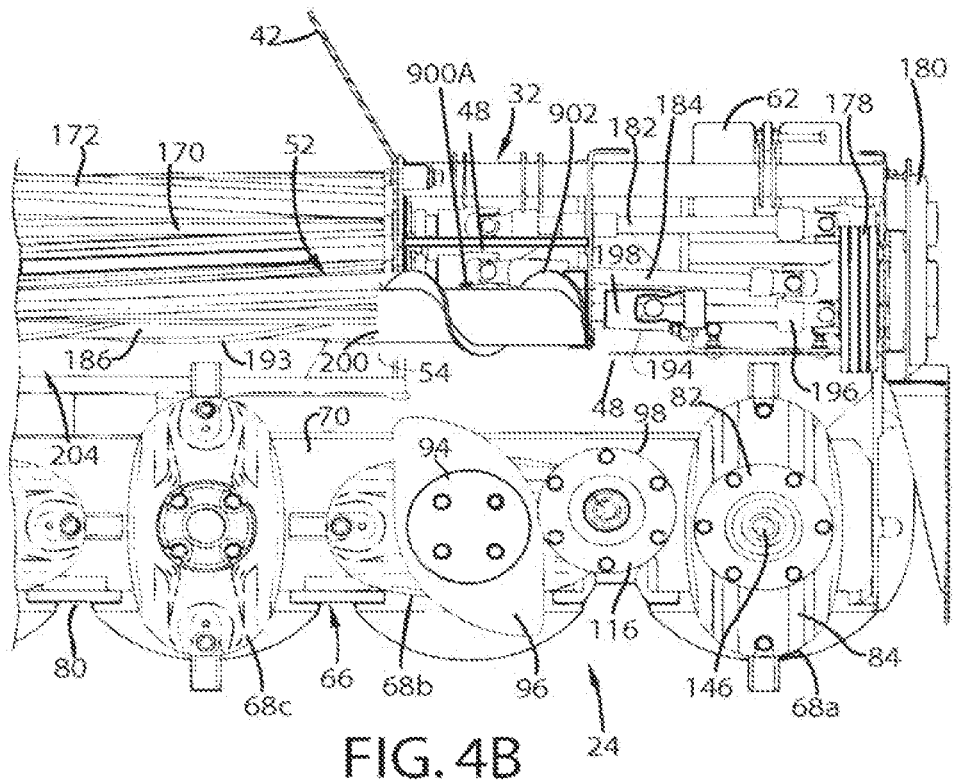
FIG. 4B shows an enlarged, fragmentary top plan view of the left side of an example embodiment of a harvesting header particularly illustrating the three leftwardmost cutters.
Figure 5B:
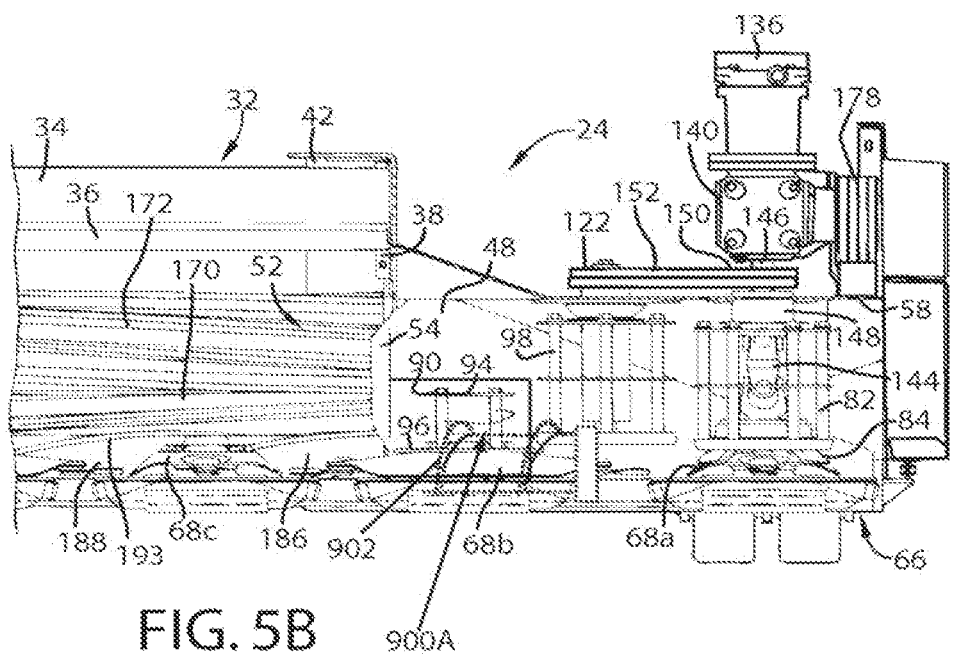
FIG. 5B shows an enlarged, fragmentary front elevational view of the left side of an example embodiment of a harvesting header.

As shown in FIGS. 4B and 5B, a belt and sheave drive 178 is connected between the horizontal output shaft (not shown) of the gearbox 140 and a spur gear transmission (also not shown) contained within an upright case 180. In the usual manner, the conditioning rolls 170, 172 are drivingly connected to the transmission by respective drive shafts 182, 184, each of which has U-joint assemblies at opposite ends thereof. The illustrated drive shaft 182 for the upper conditioning roll 170 may be connected to the driven sheave (not shown) of the belt and sheave drive 178. Accordingly, because the motors 136, 138 share the load of powering the header components, as previously noted, the conditioning rolls 170, 172 are driven by both motors 136, 138.

When header 24 takes a full width cut utilizing the entire length of cutter bed 66, the fact that the knives 74 of cutters 68c and 68h overlap the outboard terminations of conditioning ribs on rolls 170, 172 is not a particular problem. However, if a partial cut pass is taken in such a way that the left end of the cutter bed 66 is running in previously cut stubble, i.e. outboard cutters 68a and 68b are not severing new material, crop that is cut by inboard cutter 68c tends to be thrown rearwardly but in a diagonally outboard direction outboard of the terminations of conditioning ribs. Thus, it does not enter the conditioning region at all and may instead tend to collect at least temporarily behind cutters 68b and 68a, unless some means is provided for preventing that behavior.

The header 24 includes a helper roll 186 that spans the opening 52 in front of the lower front quadrant of the lower conditioner roll 172. The helper roll 186 may be constructed and arranged similar to that set forth in the '201 patent but extends outboard of the opening 52 and includes auger flighting 902 on an outer portion 900 for urging crop material that is outboard of the opening 52 laterally inward.

The helper roll 186 may be an upturning roll such that the front extremity thereof is moving upwardly and rearwardly generally toward the nip 174 between front conditioning rolls 170, 172. The helper roll 186 may be provided with axially extending, radially outwardly projecting, circumferentially spaced lugs or ribs 193 on its periphery that engage crop material as it moves rearwardly into opening 52. The helper roll 186 thus assists in delivering crop material associated with the outboard cutters laterally inward and toward the nip between front conditioning rolls 170, 172.

As previously indicated, one problem often associated with conventional windrower designs is impeded or unenven crop flow from the cutter to the conditioning rolls. The present invention specifically addresses this problem by providing structure for ensuring smooth, even crop flow from the cutter bed 66 to the upwardly and rearwardly spaced nip 174 defined between the conditioning rolls 170, 172.

Turning first to the crop conveying structure, the illustrated embodiment includes a laterally extending, rotatable roll 186 referred to as a conveyor roll or helper roll located generally between the cutter bed 66 and the lower conditioning roll 172. The illustrated helper roll 186 may comprise a tubular, cylindrically-shaped body 188 carried by a pair of stub shafts 190, 192 projecting from the ends of the body 188. As perhaps best shown in FIGS. 3, 7 and 9 the helper roll 186 may include four helical ribs 193, each extending along the length of the body 188 and having opposite inclination on either side of the midpoint of the helper roll 186. In the illustrated embodiment, the body 188 and ribs 193 are formed of metal, and the ribs 193 comprise cylindrical rods welded to the body 188, although other suitable materials and means for attaching the ribs 193 to the body 188 may be used. The ribs 193 enhance the aggressiveness of the roller periphery to further influence movement of crop material between the cutter bed 66 and nip 174.

Figure 13:
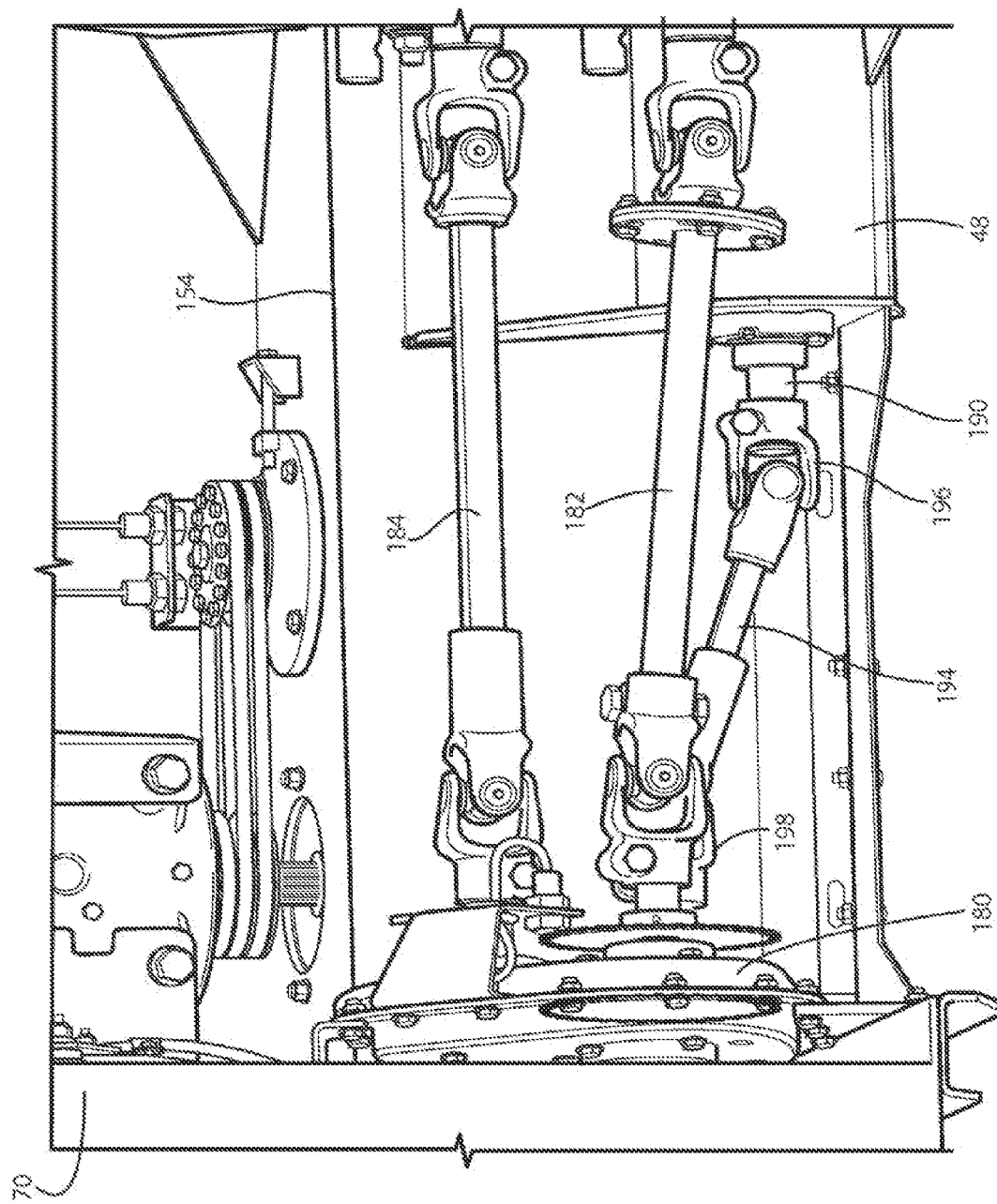
FIG. 13 shows an example embodiment of an augered helper roll employed in a harvesting header having two pairs of conditioning rolls.

Similar to conditioning rolls 170 and 172, the stub shafts 190 and 192 may be journaled for rotational movement on the supports 42 and 44 by suitable bearing assemblies 964. Additionally, the helper roll 186 may be drivingly connected to the spur gear transmission housed within the case 180 by a drive shaft 194 (see particularly FIGS. 4B, 10 and 13). The drive shaft includes U-joint assemblies 196, 198 at its opposite ends, with the outer U-joint assembly 196 being connected to an output shaft of the transmission housed within the case 180, and the inner U-joint assembly 198 being connected to the stub shaft 190. In this respect, the helper roll 186 is driven in a clockwise direction, when viewing FIG. 6, about a rotational axis defined by the stub shafts 190, 192. As seen in FIG. 13 the helper roll U-joint drive 194 is shortened to accommodate the added length of the helper roll 186 due to the auger flighting that extends laterally outward from the conditioning rolls 170, 172. As perhaps best shown in FIGS. 4A-4B and 6, guide plates 200 and 202 may be secured to the supports 42, 44 to project rearwardly from the flanges 54 and 56, respectively. The guide plates 200 and 202 may be located generally between the helper roll 186 and upper conditioning roll 170 and are spaced from the respective supports 40 and 42. The plates 200 and 202 guide crop rearwardly from the cutter bed 66 to the conditioning rolls 170, 172 and reduce the risk of crop material and trash accumulation at the ends of the roll 186.

As perhaps best shown in FIG. 6, the helper roll 186 has a diameter that is less than the diameter of the conditioning rolls 170, 172. In addition, the helper roll 186 is located within the header 24 to span the discharge opening 52 between the cutter bed 66 and the lower conditioning roll 172 and extend beyond the traditional discharge opening 52 to extend into a recess area 960. That is to say, the helper roll 186 may have a length greater than the conditioning rolls 170, 172 so that it extends laterally beyond the conditioning rolls 170, 172. The rotational axis of the helper roll 186 may be spaced below the rotational axis of the lower conditioning roll 172 and is generally aligned with the planer cutting zone defined by the knives 74. Thus, the upper front quadrant of the helper roll 186 presents an upwardly and rearwardly moving surface extending between the cutter bed 66 and the nip 174.

Figure 7:
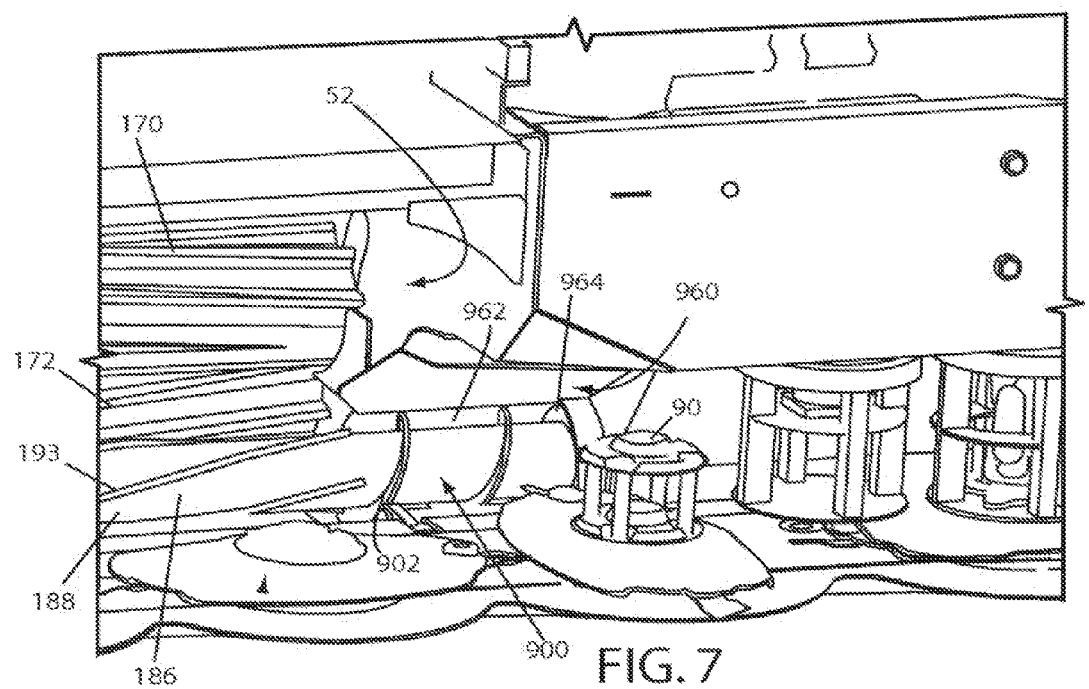
FIG. 7 shows an example embodiment of a harvesting header with an augered helper roll.
Figure 8:
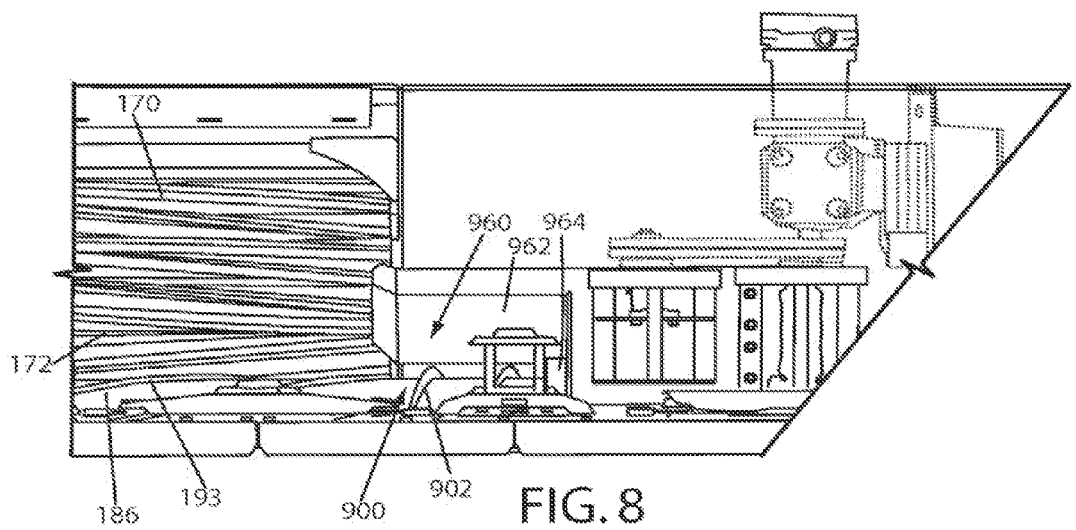
FIG. 8 shows an example embodiment of a harvesting header with an augered helper roll.

As seen in FIGS. 7 and 8 the recess area 960 may extend behind the inner impeller cage 90, 130 and include an angled wall 962. To further urge material cut by outboard cutters to the conditioning rolls 170, 172, the helper roll 186 may be provided with auger portions 900 that include auger flights 902. In the example embodiment shown in FIGS. 2-9, auger portions 900A-B may be provided on opposite ends of the helper roll 186. Other arrangements could be made, however, such as an auger portion on only one end of the helper roll 186. In the example embodiment shown in FIGS. 2-9, the auger portions 900 extend generally from the outer ends of the ribs 193 on the helper roll 186 which generally corresponds to the outer end of the discharge opening 52 and the conditioning rolls 170, 172.

Crop material provided by the outboard cutters may be engaged by the auger flights 902 provided on the helper roll 186 and moved laterally inward toward the nip 174. Crop material thrown rearwardly by the cutter bed 66 encounters the ribs 193 of helper roll 186, which in turn lifts the crop material upwardly and rearwardly to the nip 174 defined between the conditioning rolls 170, 172.

The crop material is not required to turn sharp angles, but rather rises gently and gradually from the cutter bed 66 to the nip 174. That is to say, the helper roll 186 urges the crop material laterally toward the center and to move up and through the conditioning rolls 170, 172. A downwardly open area 204 (see FIG. 4B) is defined between the cutter bed 66 and the helper roll 186, although a transverse pan (not shown) extending between the cutter bed 66 and the helper roll 186 may be placed in the area 204, if desired. The open area 204 prevents crop material and debris from accumulating between these two components and permits trash and debris moving along the path 203 to drop from the header 24. it will also be noted that the crop material conveyed inwardly by the impeller cages 82, 90, 98 and 126, 130, 134 probably passes through the discharge opening 52 above the helper roll 186 and directly into contact with the upper conditioner roll 170, although any such crop material engaging the helper roll 186 is moved along the path.

The operation of the machine should be apparent from the foregoing description. Thus, it will suffice to explain that the cutter bed 66 severs crop from the ground as the harvester 10 moves across the field. The cut crop thrown rearwardly by the outboard cutters engages the auger flights 902 on the outboard portions 900 of the helper roll 186. The crop material is thereby urged laterally inward toward the nip 174 defined between the conditioning rolls 170, 172. The impeller cages 82, 90, 98 and 126, 130, 134 cooperatively with the auger portions 900 converge crop material cut by the outboard cutters 68a, 68b and 68i, 68j inwardly and rearwardly through the discharge opening. Such converged crop is probably directed to the upper conditioning roll 170, although any converged crop engaging the helper roll 186 will be moved along the path.

Figure 11:
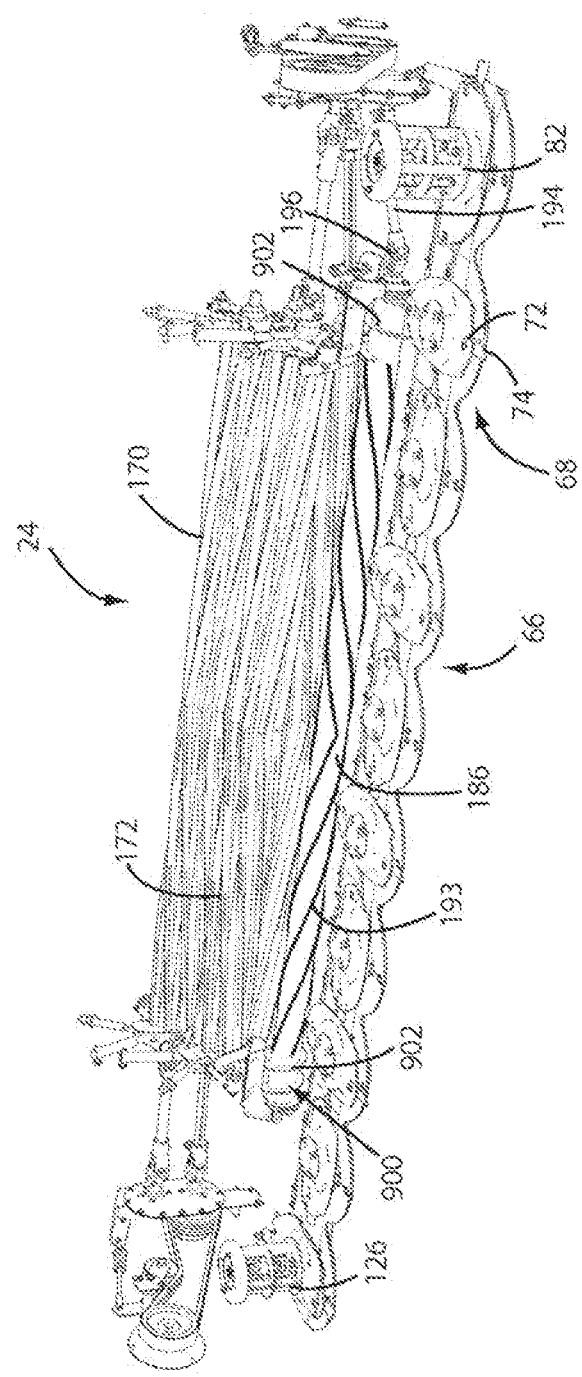
FIG. 11 shows an example embodiment of an augered helper roll employed in a harvesting header having two pairs of conditioning rolls.
Figure 12:
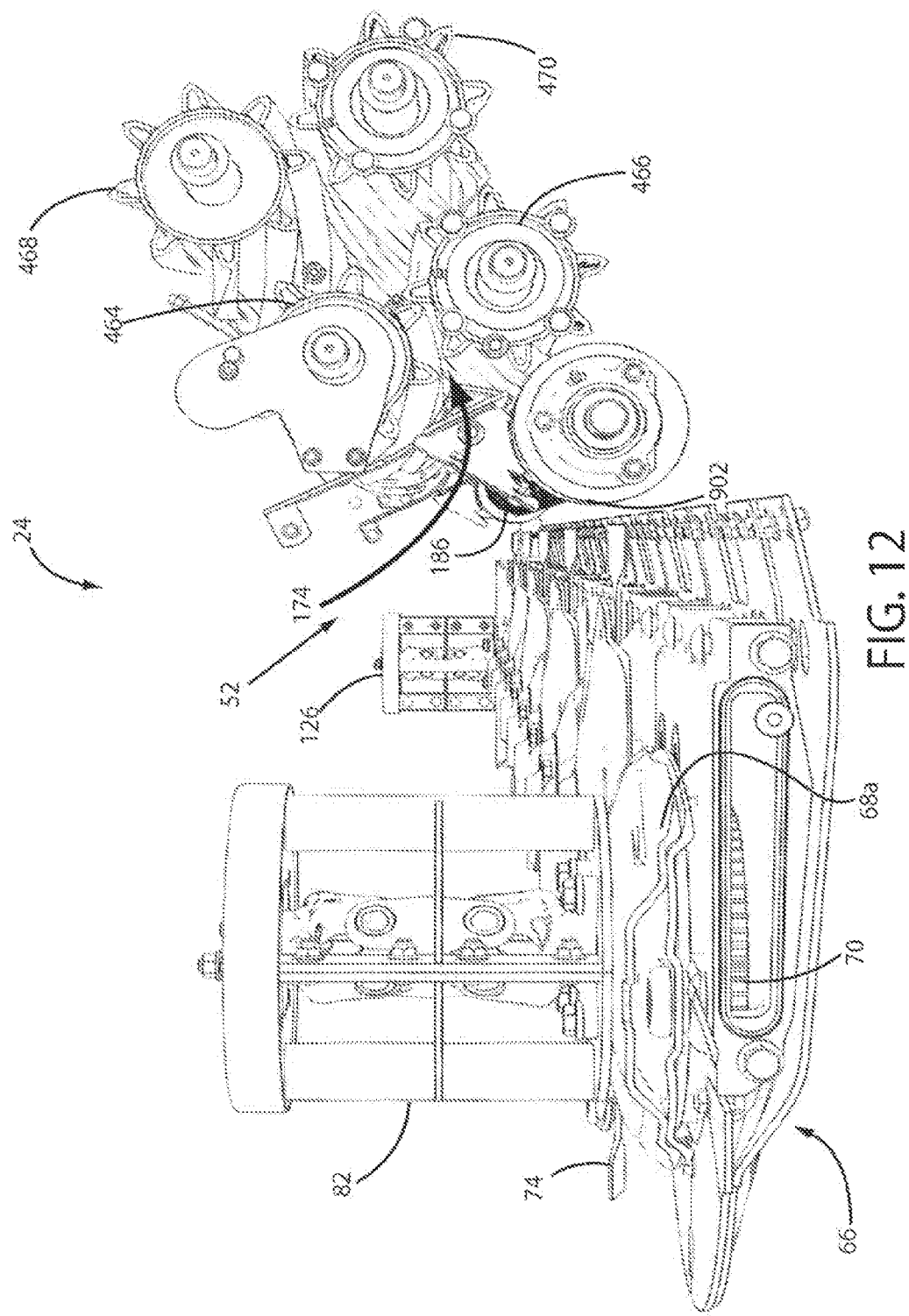
FIG. 12 shows an example embodiment of an augered helper roll employed in a harvesting header having two pairs of conditioning rolls.

As perhaps best seen in FIGS. 9-11 the helper roll 186 may have auger flighting 902 in the form of two revolutions that extend around the helper roll body 188. The flighting may extend roughly from the outer edge of the conditioning roll 172 and the end of the ribs 193 laterally outward. As seen in FIG. 12, the axis of rotation of the helper roll 186 and auger flighting 902 may be positioned rearward of the cutting bed and vertically lower than the lower conditioning roll 466. The axis of rotation of the helper roll 186 may be vertically slightly above the blades 74 of the cutter mechanism with the auger flighting 902 extending above and below the cutting level of the cutter mechanism.

Whereas the example embodiments shown in FIGS. 1-6 include a single pair of conditioning rolls 170, 172 and the use of outer 82, 126, intermediate 98, 132 and inner small 90, 130 impeller cages, other arrangements could be used. For example, as shown in FIGS. 10-12 two pairs of conditioning rolls and only outer impeller cages 82, 126 may be used. In FIGS. 10-12 the header 24 may be constructed such that behind the cutter bed 66 is a crop conditioning region 52 in which the set of conditioning rolls 429 is located. In the illustrated embodiment, the set of rolls 429 includes two pairs of cooperating conditioning rolls, although a single pair or more than two pairs could be utilized. The front rolls 464, 466 define a nip therebetween through which severed crop materials pass as they are being conditioned. Likewise, rear conditioner rolls 468, 470 define a nip for receiving crop materials from front rolls 464, 466 and conditioning such materials before projecting them rearwardly for deposit on the ground in the form of a windrow or swath as understood by those skilled in the art. Upper rolls 464, 468 may be biased downwardly toward respective lower rolls 466, 470 by tension means not illustrated so as to maintain a degree of yieldable intermeshing of the rolls depending upon the volume of crop materials passing therebetween.

While the helper roll 186 is shown in FIGS. 2-9 as being a single roll, the helper roll 186 may comprise one or more rolls. For example, as shown in FIGS. 10-12 a helper roll 186 may comprise two sub-helper rolls 187A-187B that are rotatably mounted by a bearing assembly 800 over the discharge opening 52. This arrangement provides improved rigidity for the helper roll 186 by providing an additional support point. This may also allow for a helper roll of greater length. In this example embodiment, the helper roll 186 extends beyond the width of the conditioning roll 172. Each sub-helper roll 187 may generally be formed by splitting a single helper roll 186 so that each sub-helper roll 187 includes an auger portion 900 and a ribbed portion 910. The sub-helper rolls 187A, 187B may be coupled at interior ends to generally form a helper roll 186.

Figure 14:
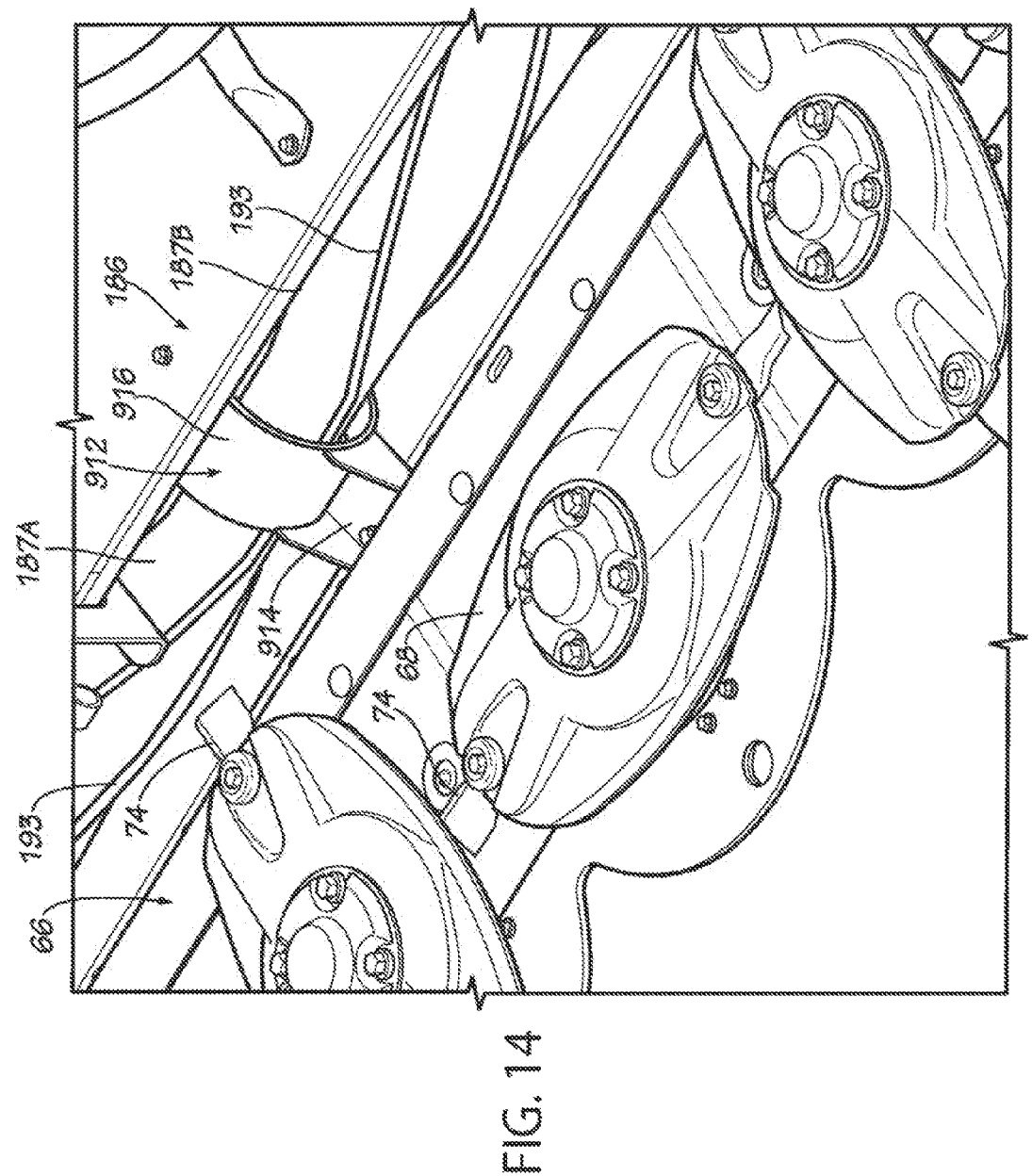
FIG. 14 shows an example embodiment of a helper roll that includes two sub-helper rolls.

As shown in FIG. 14 a mount 912 that includes a mounting bracket 914 and circular housing 916 may be used to attach a bearing assembly 800 to the cutting bed 66 by bolts or other fasteners. While in this example, two sub-helper rolls 187A, 187B are provided that are of generally equal length and coupled in the center of the discharge opening 52, other arrangements could be used such as additional sub-helper rolls 187C . . . N that contain an auger portion, only a ribbed portion, neither, or both. For example, additional sub-helper rolls 187C . . . N may be mounted in a similar way by using additional mounting brackets 914 and bearing assemblies 800. The mounting brackets may be attached to the cuter bed such that the bearing assembly 800 is positioned in front of the conditioner roll 172 and each sub-helper roll 187 is axially aligned.

Figure 15:
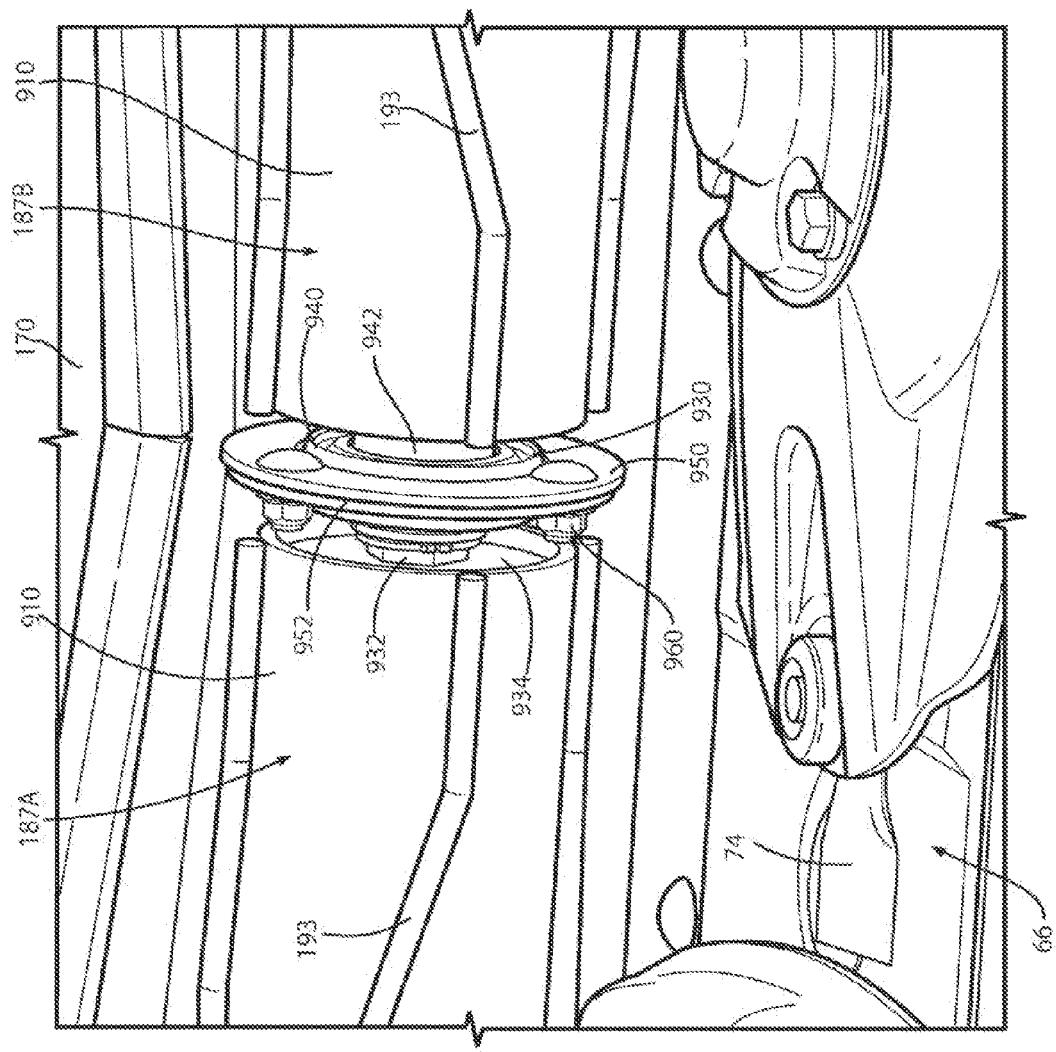
FIG. 15 shows an example embodiment of a helper roll that includes two sub-helper rolls.

FIGS. 15 and 16 show an example embodiment of a connection of two sub-helper rolls 187A, 187B that together form a subroll 186. A hex bore bearing assembly 930 has a hex bore shaft 932 that extends through bulkheads 934 of the right and left sub-helper rolls 187A, 187B and between the outer race 940 and inner race 942 to rotatably support the sub-helper rolls 187A, 187B. Coupling plates 950, 952 may be coupled together by bolts 960 or other fasteners. The sub-helper rolls 187A, 187B may be driven as discussed above in conjunction with a unitary roll 186. For example, one sub-helper roll 187A may be driven by the shafts 194, 190 (see FIG. 13) so as to turn the first sub-helper roll 187A which in turn rotates the second sub-helper roll 187B by virtue of the bearing assembly 930.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. For example, whereas in the example embodiments the helper roll is shown extending only partly the length of the header, the helper roll could extend the entire header length. Likewise, although in the example embodiments the auger portion of the helper roll generally extends from the ends of the conditioning roll, the auger portion could be greater or smaller and extend outboard and inboard of the conditioning rolls. For example, the helper roll could extend at any point between the conditioner opening and the end of the header.

Accordingly, other aspects and a more comprehensive understanding of the invention may be obtained by referring to the detailed description of the exemplary embodiments taken in conjunction with the accompanying drawings.

What is claimed is:

1. A harvesting header, comprising:
    a crop cutting assembly comprising a series of rotary cutters that define a laterally extending generally planar cutting zone along which crop material is severed from the ground by the cutting assembly;
    a discharge opening through which the cut crop passes as it moves rearwardly in the header;
    a pair of laterally extending crop conditioning rolls defining a nip therebetween that is spaced upwardly and rearwardly from the cutting zone and placed forward of and having a length of the discharge opening so as to condition crop before it passes through the discharge opening;
    a helper roll positioned rearwardly of the cutting zone and forwardly of the conditioning rolls and having a length greater than the length of the conditioning rolls, said helper roll having an interior ribbed portion configured to urge the crop material rearward toward the nip of the conditioning rolls and outer portions having auger flighting configured to urge the crop material laterally inward, wherein the auger flighting extends outwardly from the ribbed portion such that the auger flighting is positioned outwardly of the conditioning rolls and discharge opening, and
wherein the axis of rotation of the helper roll is above the plane of the cutting zone, and wherein the auger flighting extends below the plane of the cutting zone.

2. The harvesting header of claim 1, wherein the auger flighting of the helper roll is rotatable upwardly and rearwardlly between the cutting zone and the nip such that the auger flighting moves crop material laterally inward toward the conditioning rolls.

* * * * *